(12) United States Patent
Hong et al.

(10) Patent No.: US 9,351,221 B2
(45) Date of Patent: May 24, 2016

(54) METHOD AND APPARATUS FOR FACILITATING A S1 HANDOVER OF A MOBILE TERMINAL THAT HAS EXPERIENCED IN-DEVICE COEXISTENCE INTERFERENCE AT ONE OR MORE FREQUENCIES

(75) Inventors: Wei Hong, Beijing (CN); Na Wei, Beijing (CN); Haiming Wang, Beijing (CN); Erlin Zeng, Beijing (CN); Jari Isokangas, Tampere (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/386,199

(22) PCT Filed: Mar. 19, 2012

(86) PCT No.: PCT/CN2012/072523
§ 371 (c)(1),
(2), (4) Date: Sep. 18, 2014

(87) PCT Pub. No.: WO2013/138976
PCT Pub. Date: Sep. 26, 2013

(65) Prior Publication Data
US 2015/0072687 A1 Mar. 12, 2015

(51) Int. Cl.
*H04W 36/30* (2009.01)
*H04W 36/00* (2009.01)

(52) U.S. Cl.
CPC .......... *H04W 36/30* (2013.01); *H04W 36/0055* (2013.01)

(58) Field of Classification Search
CPC ..... H04W 36/60; H04W 36/18; H04W 36/08; H04W 36/14; H04W 36/12; H04W 36/0055
See application file for complete search history.

(56) References Cited

U.S. PATENT DOCUMENTS

| 2010/0002650 A1* | 1/2010 | Ahluwalia | H04L 1/1874 370/331 |
| 2010/0177739 A1* | 7/2010 | Huang | H04W 36/02 370/331 |
| 2012/0033641 A1 | 2/2012 | Huang | |

FOREIGN PATENT DOCUMENTS

| CN | 101400088 A | 4/2009 |
| CN | 102378192 A | 3/2012 |

* cited by examiner

*Primary Examiner* — Ted Wang
(74) *Attorney, Agent, or Firm* — Oblon, McClelland, Maier & Neustadt, L.L.P.

(57) ABSTRACT

A method, apparatus, and computer program product are provided to reduce coexistence interference that may occur following a S1 handover. The method, apparatus and computer program product may provide the target access point with information regarding one or more frequencies to be avoided so as to reduce instances of coexistence interference that might otherwise occur following a SI handover.

19 Claims, 7 Drawing Sheets

```
Receive signaling indicataing that a handover is required including      ─ 70
  (1) an indication of whether the handover is an SI handover
triggered by in-device coexistence interference and (2) one or
             more frequencies to be avoided
                            │
                            ▼
Cause a request to be provided to an MME indicating that a
handover is required including information elements indicating          ─ 72
 that the handover is an SI handover triggered by in-device
     coexistence interference and one or more frequencies to be
                         avoided
```

ND APPARATUS FOR
FACILITATING A S1 HANDOVER OF A
MOBILE TERMINAL THAT HAS
EXPERIENCED IN-DEVICE COEXISTENCE
INTERFERENCE AT ONE OR MORE
FREQUENCIES

TECHNOLOGICAL FIELD

An example embodiment to the present invention relates generally to the handover of a mobile terminal between access points and, more particularly, to a S1 handover of a mobile terminal that has experienced in-device coexistence interference at one or more frequencies.

BACKGROUND

Figure 1:
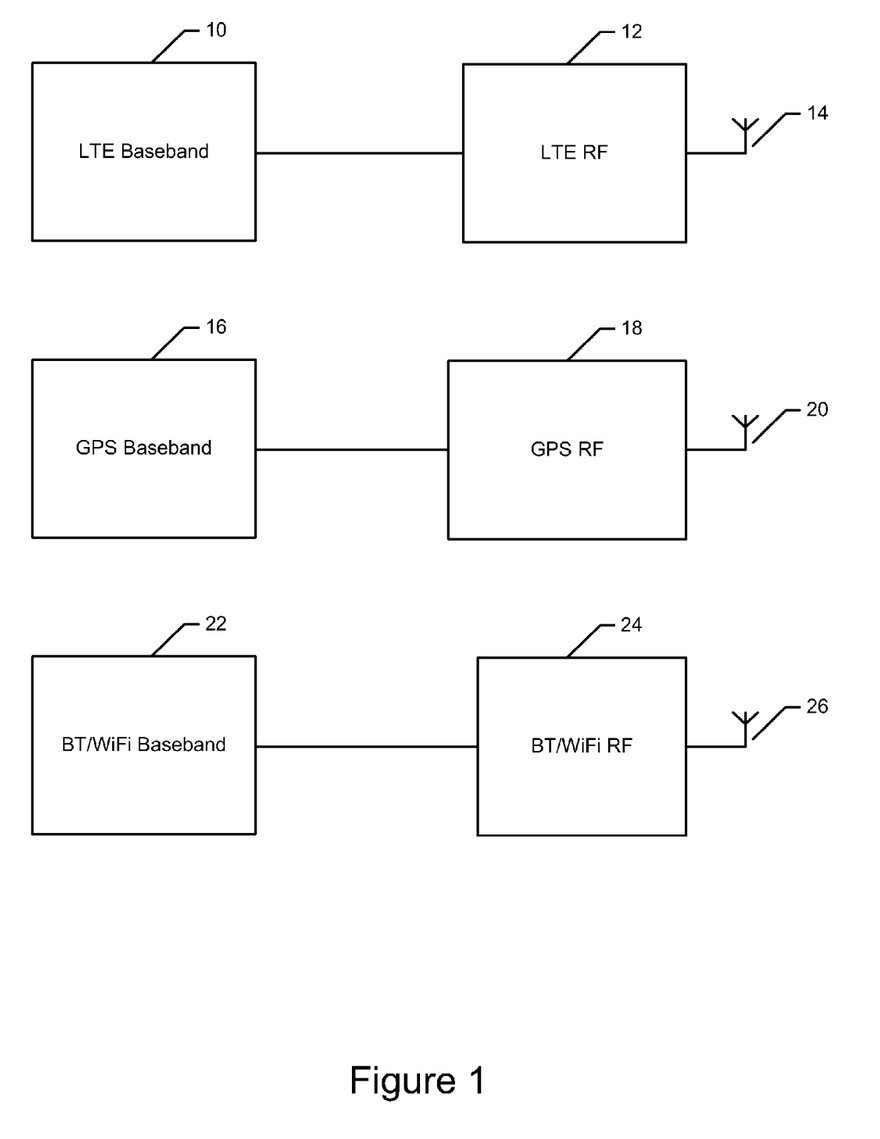
FIG. 1 is a schematic representation of a plurality of radio transceivers that may be employed by a mobile terminal.

Mobile terminals, such as cellular telephones, personal digital assistants (PDAs), tablet computers or the like commonly provide for access to a variety of networks and services. As such, many mobile terminals include a plurality of radio transceivers. By way of example, FIG. 1 illustrates multiple radio transceivers included within a mobile terminal that supports access to a long-term evolution (LTE) network, access to global positioning system (GPS) services and supports Bluetooth and/or Wi-Fi communications. As such, the mobile terminal of this example embodiment includes LTE base band circuitry 10, LTE radio frequency (RF) circuitry 12 and an antenna for transmitting and receiving LTE signals. Additionally, the mobile terminal of this example includes GPS base band circuitry 16, GPS RF circuitry 18 and an antenna 20 for transmitting and receiving GPS signals. Further, the mobile terminal of this example includes Bluetooth and/or Wi-Fi base band circuitry 22, Bluetooth and/or Wi-Fi RF circuitry 24 and an associated antenna 26 for transmitting and receiving Bluetooth and/or Wi-Fi signals.

As a result of the proximity of the plurality of radio transceivers, typically due to the relatively small form factor of the mobile terminal, in-device coexistence interference between the plurality of radio transceivers may be created, such as interference between the LTE signals, the GPS signals and the Bluetooth and/or Wi-Fi signals. In this regard, the proximity of the plurality of radio transceivers may allow for a situation in which the transmit power level of one transmitter is substantially greater than the received power level of another receiver. In order to mitigate against coexistence interference, filter technologies have been implemented, and frequency separation between the radio transceivers has been designed so as to avoid coexistence interference for at least some of the signals transmitted by the radio transceivers. However, there are certain coexistence scenarios, such as those involving different radio technologies that operate on adjacent frequencies for which the filter technology may be insufficient to prevent coexistence interference.

A mobile terminal in communication with a source access point, such as a source enhanced Node B (eNodeB), may determine one or more frequencies, such as a range of frequencies, that should be avoided in order to provide sufficient frequency separation so as to reduce the impact of coexistence interference. However, a mobile terminal may be handed over from the source access point that is currently serving the mobile terminal to a target access point, such as a target eNodeB, that will service the mobile terminal in the future. Following the handover, the information regarding the frequencies to be avoided in order to reduce coexistence interference may be lost such that coexistence interference may be greater following the handover than prior to the handover.

Indeed, a ping-pong effect may occur in which a mobile terminal that has learned to avoid the use of a certain range of frequencies so as to maintain sufficient frequency separation while served by a source access point may begin using a frequency within the range while served by a target access point so as to again suffer from in-device coesistence interference.

For mobile terminals in an active mode, there are two types of handover procedures in an LTE network, namely, an X2-handover procedure and a S1-handover procedure. For intra-LTE mobility, the X-2-handover procedure is typically employed for an inter-eNodeB handover. However, in instances in which there is no X-2 interface between the eNodeBs or in an instance in which the source eNodeB has been configured to initiate a handover toward a target eNodeB via a S1 interface, a S1 handover will be triggered. Additionally, S1 handovers may be utilized between at least some home eNodeBs (HeNBs) such as in conjunction with Releases 8 and 9 of HeNBs and in instances in which the mobility management entity (MME) performs access control. While techniques have been proposed in order to make a target access point aware of the frequencies to be avoided in order to reduce the coexistence interference in conjunction with X2 handovers, this information is not shared during a S1 handover such that the target access point may utilize one of the frequencies that was being avoided by the source access point, thereby incurring coexistence interference.

BRIEF SUMMARY

A method, apparatus, and computer program product are therefore provided in order to reduce coexistence interference that may occur following a S1 handover. In this regard, a method, apparatus and computer program product may be provided in order to provide the target access point with information regarding one or more frequencies to be avoided so as to reduce instances of coexistence interference that might otherwise occur following a S1 handover. By providing the target access point with information regarding the frequencies to be avoided that has previously been utilized by the source access point to avoid a reduced coexistence interference, the method, apparatus and computer program product of an example embodiment may reduce or eliminate the ping-pong effect following a S1 handover.

In one embodiment, a method is provided that causes signaling to be provided to a mobility management entity (MME) indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided. In this embodiment, the method also receives a handover command in response to the signaling.

In another embodiment, an apparatus is provided that includes at least one processor and at least one memory including computer program code with the at least one memory and the computer program code arranged to, with the at least one processor, cause the apparatus at least to cause signaling to be provided to a mobility management entity (MME) indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided. In this embodiment, the at least one memory and the computer program code are also arranged to, with the at least one processor, cause the apparatus to receive a handover command in response to the signaling.

In a further embodiment, a computer program product is provided that includes at least one non-transitory computer-readable storage medium having computer-readable program instructions stored therein with the computer-readable program instructions including program instructions configured to cause signaling to be provided to a mobility management entity (MME) indicating that a handover is required. The signaling of this embodiment includes at least one of an information element that includes a value that indicates whether the handover is a S1 handover of a mobile terminal that has experienced in-device coexistence interference at one or more frequenciesor an information element that identifies one or more frequencies to be avoided. In this embodiment, the computer-readable program instructions also include program instructions configured to receive a handover command in response to the signaling.

In yet another embodiment, an apparatus is provided that includes means for causing signaling to be provided to a mobility management entity (MME) indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided. In this embodiment, the apparatus also includes means for receiving a handover command in response to the signaling.

In one embodiment, a method is provided that receives signaling indicating that a handover is required. The signaling of this embodiment includes at least one an information element that includes a value that indicates whether the handover is a S1 handover of a mobile terminal that has experienced in-device coexistence interference at one or more frequencies or an information element that identifies one or more frequencies to be avoided during and after the handover. In this embodiment, the method also causes a request to be provided to a mobility management entity (MME) indicating that a handover is required. The request of this embodiment includes at least one of an information element that includes a value that indicates that the handover is a S1 handover of a mobile terminal that has experienced in-device coexistence interference at one or more frequencies or an information element that identifies one or more frequencies to be avoided.

In another embodiment, an apparatus is provided that includes at least one processor and at least one memory including computer program code with the at least one memory and the computer program code arranged to, with the at least one processor, cause the apparatus at least to receive signaling indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided during and after the handover. In this embodiment, the at least one memory and the computer program code are also arranged to, with the at least one processor, cause the apparatus to cause a request to be provided to a mobility management entity (MME) indicating that a handover is required. The request of this embodiment includes at least one of an information element that includes a value that indicates that the handover is a S1 handover of a mobile terminal that has experienced in-device coexistence interference at one or more frequencies or an information element that identifies one or more frequencies to be avoided.

In a further embodiment, a computer program product is provided that includes at least one non-transitory computer-readable storage medium having computer-readable program instructions stored therein with the computer-readable program instructions including program instructions configured to receive signaling indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided during and after the handover. In this embodiment, the computer-readable program instructions also include program instructions configured to cause a request to be provided to a mobility management entity (MME) indicating that a handover is required. The request of this embodiment includes at least one of an information element that includes a value that indicates that the handover is a S1 handover or an information element that identifies one or more frequencies to be avoided.

In yet another embodiment, an apparatus is provided that includes means for receiving signaling indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided during and after the handover. In this embodiment, the apparatus also includes means for causing a request to be provided to a mobility management entity (MME) indicating that a handover is required. The request of this embodiment includes at least one of an information element that includes a value that indicates that the handover is a S1 handover of a mobile terminal that has experienced in-device coexistence interference at one or more frequencies or an information element that identifies one or more frequencies to be avoided.

In one embodiment, a method is provided that receives a request indicating that a handover is required. The request of this embodiment includes at least one of an information element that indicates that the handover is a S1 handover of a mobile terminal that has experienced in-device coexistence interference at one or more frequencies or an information element that identifies one or more frequencies to be avoided during and after the handover. In this embodiment, the method also causes signaling to be provided to an access point indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided.

In another embodiment, an apparatus is provided that includes at least one processor and at least one memory including computer program code with the at least one memory and the computer program code arranged to, with the at least one processor, cause the apparatus at least to receive a request indicating that a handover is required. The request of this embodiment includes at least one of an information element that indicates that the handover is a S1 handover of a mobile terminal that has experienced in-device coexistence interference at one or more frequencies or an information element that identifies one or more frequencies to be avoided during and after the handover. In this embodiment, the at least one memory and the computer program code are also arranged to, with the at least one processor, cause the apparatus to cause signaling to be provided to an access point indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided.

In a further embodiment, a computer program product is provided that includes at least one non-transitory computer-readable storage medium having computer-readable program instructions stored therein with the computer-readable program instructions including program instructions configured to receive a request indicating that a handover is required. The request of this embodiment includes at least one of an information element that indicates that the handover is a S1 handover of a mobile terminal that has experienced in-device coexistence interference at one or more frequencies or an information element that identifies one or more frequencies to be avoided during and after the handover. In this embodiment, the computer-readable program instructions also include program instructions configured to cause signaling to be provided to an access point indicating that a handover is required. The signaling of this embodiment includes at least one of an information element that includes a value that indicates whether the handover is a S1 handover of a mobile terminal that has experienced in-device coexistence interference at one or more frequencies or an information element that identifies one or more frequencies to be avoided.

In yet another embodiment, an apparatus is provided that includes means for receiving a request indicating that a handover is required. The request of this embodiment includes at least one of an information element that indicates that the handover is a S1 handover of a mobile terminal that has experienced in-device coexistence interference at one or more frequencies or an information element that identifies one or more frequencies to be avoided during and after the handover. In this embodiment, the apparatus also includes means for causing signaling to be provided to an access point indicating that a handover is required. The signaling of this embodiment includes an information element that includes a value that indicates whether the handover is a S1 handover of a mobile terminal that has experienced in-device coexistence interference at one or more frequencies. The signaling of this embodiment also includes an information element that identifies one or more frequencies to be avoided.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product are provided in accordance with an example embodiment of the present invention in order to reduce the effects of in-device coexistence interference following a S1 handover. In this regard, the method, apparatus and computer program product can provide a target access point with information regarding one or more frequencies to be avoided as a result of coexistence interference that may be created by transmission or reception at these frequencies. Thus, the target access point may learn from the experience of the source access point that has determined or otherwise been informed of the one or more frequencies that are to be avoided in order to reduce coexistence interference and may avoid a return to those frequencies. Thus, the method, apparatus and computer program product of an example embodiment may avoid the ping-pong effect with respect to the undesirable frequencies during and after a S1 handover of a mobile terminal that has experienced in-device coexistence interference at one or more frequencies.

Figure 2:
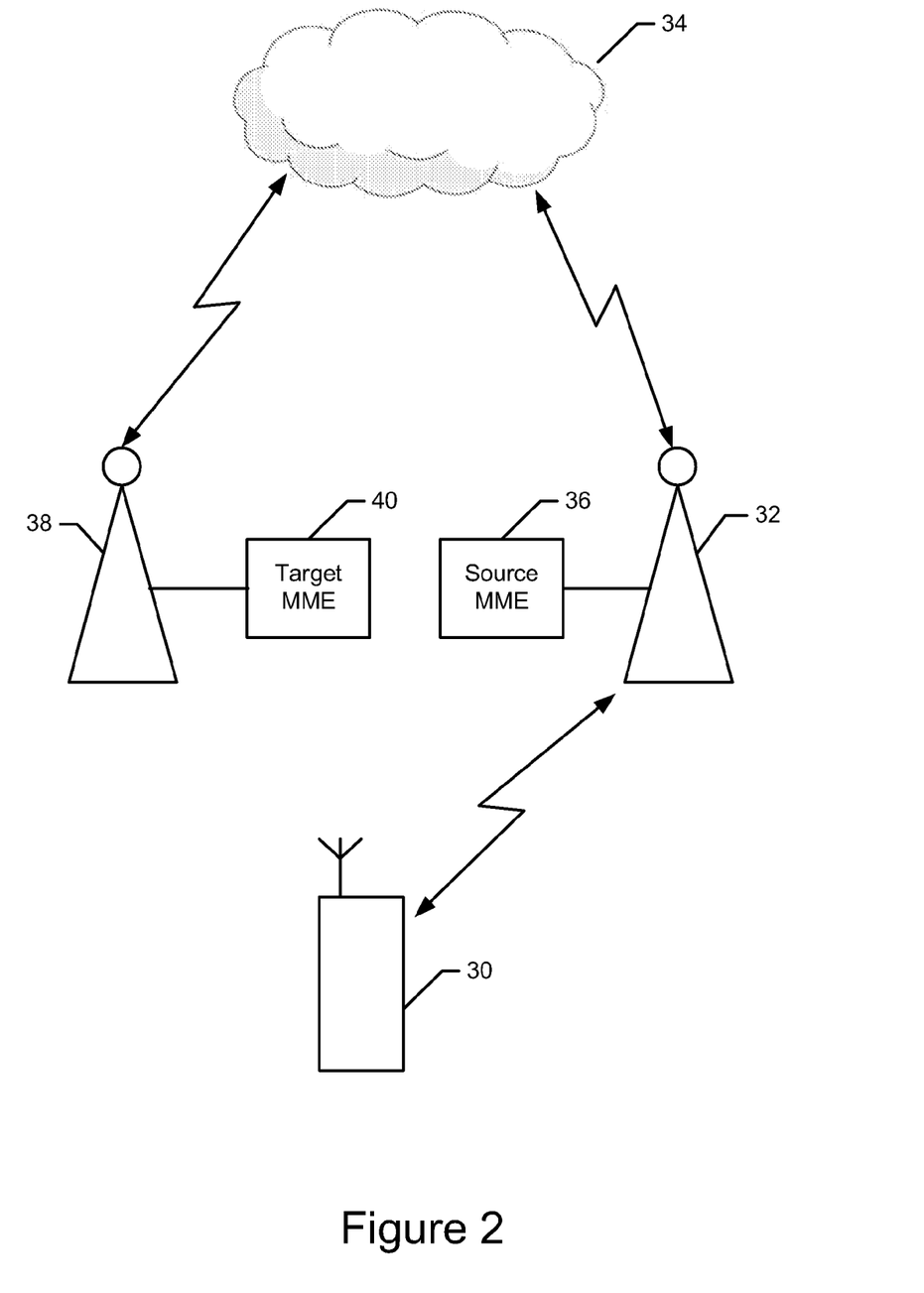
FIG. 2 is a schematic representation of a system including source and target access points and associated mobility management entities that may be specifically configured to provide for a S1 handover of the mobile terminal in accordance with an example embodiment of the present invention.

The method, apparatus and computer program product may be implemented in conjunction with a variety of systems. By way of example, FIG. 2 depicts a system that supports communication with a mobile terminal 30 and may be specifically configured in accordance with an example embodiment to the present invention. In this regard, the mobile terminal may be configured to communicate via a source access point 32 that is currently servicing the mobile terminal with a network 34. Various types of mobile terminals may be employed in conjunction with the system of FIG. 2 including, for example, mobile communication devices such as, for example, mobile telephones, PDAs, pagers, laptop computers, tablet computers or any of numerous other hand held or portable communication devices, computation devices, content generation devices, content consumption devices, or combinations thereof.

Regardless of the type of mobile terminal, the mobile terminal 30 includes a plurality of radio transceivers. Thus, the mobile terminal may include a radio transceiver configured to communicate via an access point with the network 34. In one embodiment, the mobile terminal may include an LTE radio transceiver configured to communicate via an access point, e.g., an eNB, with an LTE network. However, the mobile terminal may include other types of radio transceivers configured to communicate with other types of networks. In addition, the mobile terminal includes one or more other radio transceivers, such as a GPS radio transceiver, a Bluetooth radio transceiver, a Wi-Fi radio transceiver or the like.

The mobile terminal 30 may be configured to communicate with a variety of different networks 34, including an LTE network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network. As illustrated in FIG. 2, communication between the mobile terminal and the network is supported by a source access point 32. As a result of the movement of the mobile terminal or other changes in the radio transmissions between the access points and the mobile terminal, the mobile terminal may be handed over from the source access point to a target access point 38. The source and target access points may be embodied in various manners, including base stations, node Bs, evolved node Bs (eNBs), home evolved node Bs (HeNBs) or the like. As also shown in FIG. 2, each access point may be associated with and in communication with a respective mobility management entity (MME), such as the source MME 36 associated with source access point and the target MME 40 associated with the target access point.

Figure 3:
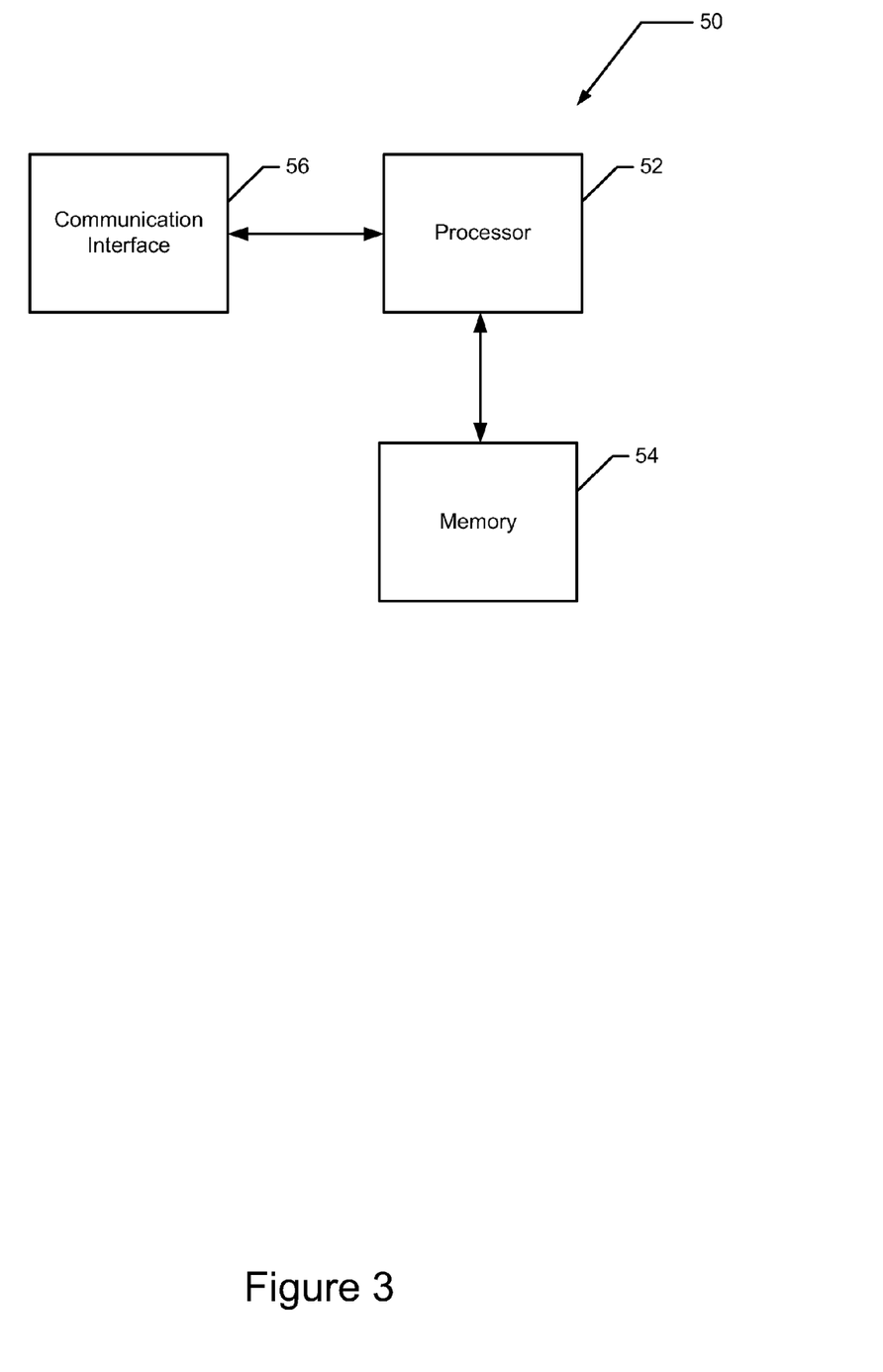
FIG. 3 is a block diagram of an apparatus that may be embodied or otherwise included by an access point or a mobility management entity and that may be specifically configured in accordance with an example embodiment of the present invention.

The source access point 32, the source MME 36 and the target MME 40 may each embody or otherwise be associated with an apparatus 50 that is generally depicted in FIG. 3 and that may be configured to perform various operations in accordance with an example embodiment of the present invention as described below, such as in conjunction with FIG. 4 from the perspective of the source access point, FIG. 6 from the perspective of the source MME and FIG. 7 from the perspective of the target MME. However, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 50 may include or otherwise be in communication with a processing system including, for example, processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 52 and memory 54 that may be in communication with or otherwise control a communication interface 56. As such, the processing circuitry may be embodied as a circuit chip (e.g., an integrated circuit chip) configured (e.g., with hardware, software or a combination of hardware and software) to perform operations described herein. However, in some embodiments taken in the context of the source access point 32, source MME 36 or target MME 40, the processing circuitry may be embodied as a portion of source access point, the source MME or the target MME, respectively.

The communication interface 56 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 34 and/or any other device or module in communication with the processing circuitry, such as between an access point and an MME. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 54 may include one or more non-transitory memory devices such as, for example, volatile and/or non-volatile memory that may be either fixed or removable. The memory may be configured to store information, data, applications, instructions or the like for enabling the apparatus 50 to carry out various functions in accordance with example embodiments of the present invention. For example, the memory could be configured to buffer input data for processing by the processor 52. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 52 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, FIGS. 4, 6 and 7 are flowcharts illustrating the operations performed by a method, apparatus and computer program product, such as apparatus 50 of FIG. 3, from the perspective of the a source access point 32, a source MME 36 and a target MME 40, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 54 of an apparatus employing an embodiment of the present invention and executed by a processor 52 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 4, 6 and 7, when executed, convert a computer or processing circuitry into a particular machine configured to perform an example embodiment of the present invention. Accordingly, the operations of FIGS. 4, 6 and 7 define an algorithm for configuring a computer or processing circuitry, e.g., processor, to perform an example embodiment. In some cases, a general purpose computer may be provided with an instance of the processor which performs the algorithm of FIGS. 4, 6 and 7 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIGS. 4 and 10. It should be appreciated that each of the modifications, optional additions or amplifications below may be included with the operations above either alone or in combination with any others among the features described herein.

Figure 4:
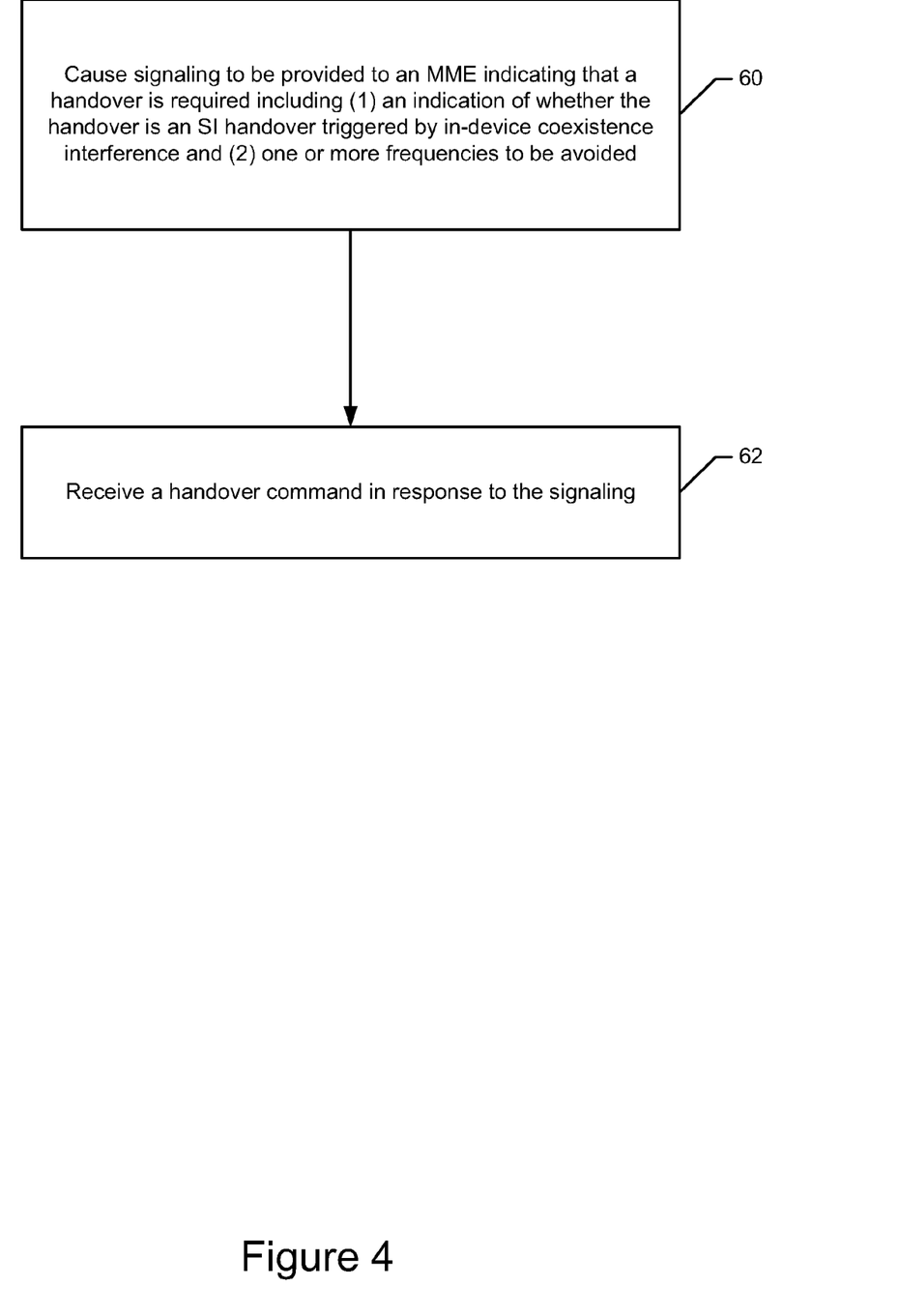
FIG. 4 is a flowchart illustrating the operations performed by a source access point in accordance with example embodiments of the present invention.

Referring now to FIG. 4 and in an instance in which a S1 handover is to be made from a source access point 32 to a target access point 38, the operations performed by a method, apparatus and computer program product of an example embodiment are illustrated from the perspective of an apparatus 20 that may be embodied by or otherwise associated with the source access point. In this regard, the apparatus may include means, such as the processing circuitry, the processor 52, the communication interface 56 or the like, for causing signaling to be provided to a source MME 36 that is associated with or otherwise in communication with the source access point indicating that a S1 handover is required. See block 60 of FIG. 4. The signaling that is provided to the source MME may include an information element that, in turn, includes a value that indicates whether the handover is a S1 handover of a mobile terminal that has experienced in-device coexistence interference at one or more frequencies. Alternatively or additionally, the signaling may include an information element that identifies one or more frequencies to be avoided, such as by identifying a range or list of frequencies to be avoided.

Figure 5:
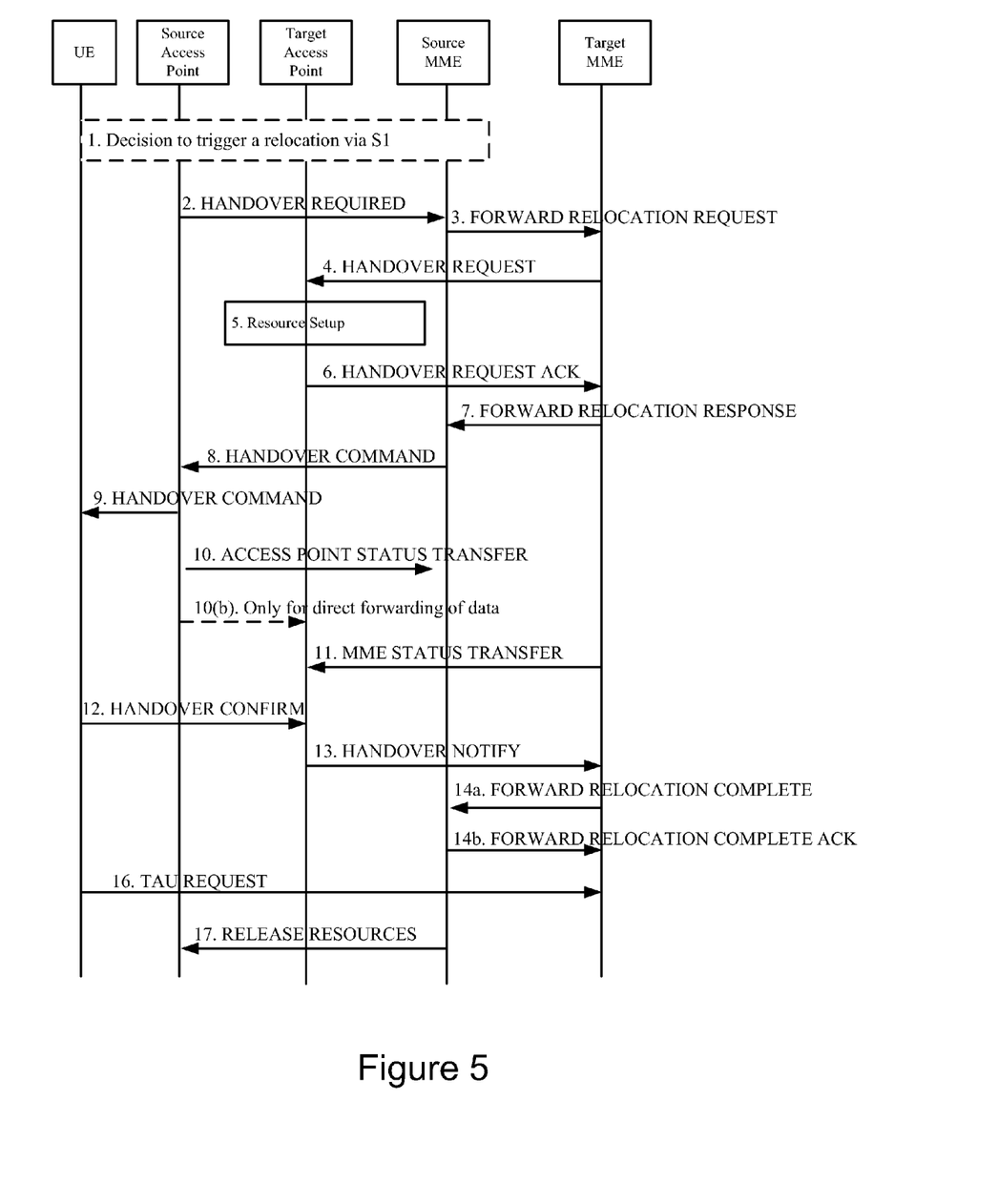
FIG. 5 is a signaling flow diagram illustrating the signal flow between a mobile terminal, source and target access points and source and target mobility management entities in order to effect a S1 handover.

Referring now to FIG. 5, one example of a signal flow in conjunction with a S1 handover from a source access point 32 to a target access point 38 is illustrated. In FIG. 5 and following an initial decision to trigger a relocation via a S1 handover, Handover Required signaling may be transmitted from the source access point to the source MME 36. As such, the apparatus 50 embodied by the source access point, such as the processor 52, the communication interface 56 or the like, may include the signaling that provides an indication as to whether the handover is a S1 handover of a mobile terminal that has experienced in-device coexistence interference at one or more frequencies and that indicates one or more frequencies to be avoided in the Handover Required signaling. In this regard, the value that indicates whether the handover is a S1 handover of a mobile terminal that has experienced in-device coexistence interference at one or more frequencies may be added to an existing information element that is transmitted by the Handover Required signaling. For example, the value that indicates whether the handover is a S1 handover of a mobile terminal that has experienced in-device coexistence interference at one or more frequencies may be included within a Handover-type information element, a Cause information element or a Message-type information element. In addition or alternatively, the Handover Required signaling may include an additional information element that identifies one or more frequencies to be avoided. As noted above, the identification of the one or more frequencies to be avoided may include a range of frequencies to be avoided by the target access point following the S1 handover such as an in-device coexistence interference unusable frequency list information element.

Thereafter, the apparatus 50 embodied by the source access point 32 may include means, such as the processing circuitry, the processor 52, the communication interface 56 or the like, for receiving a handover command in response to the signaling. See block 62 of FIG. 4. With reference to FIG. 5, a Handover Command (message 8) may be received by the source access point. Thereafter, the signaling for the handover may be completed as shown, for example, in FIG. 5.

Figure 6:
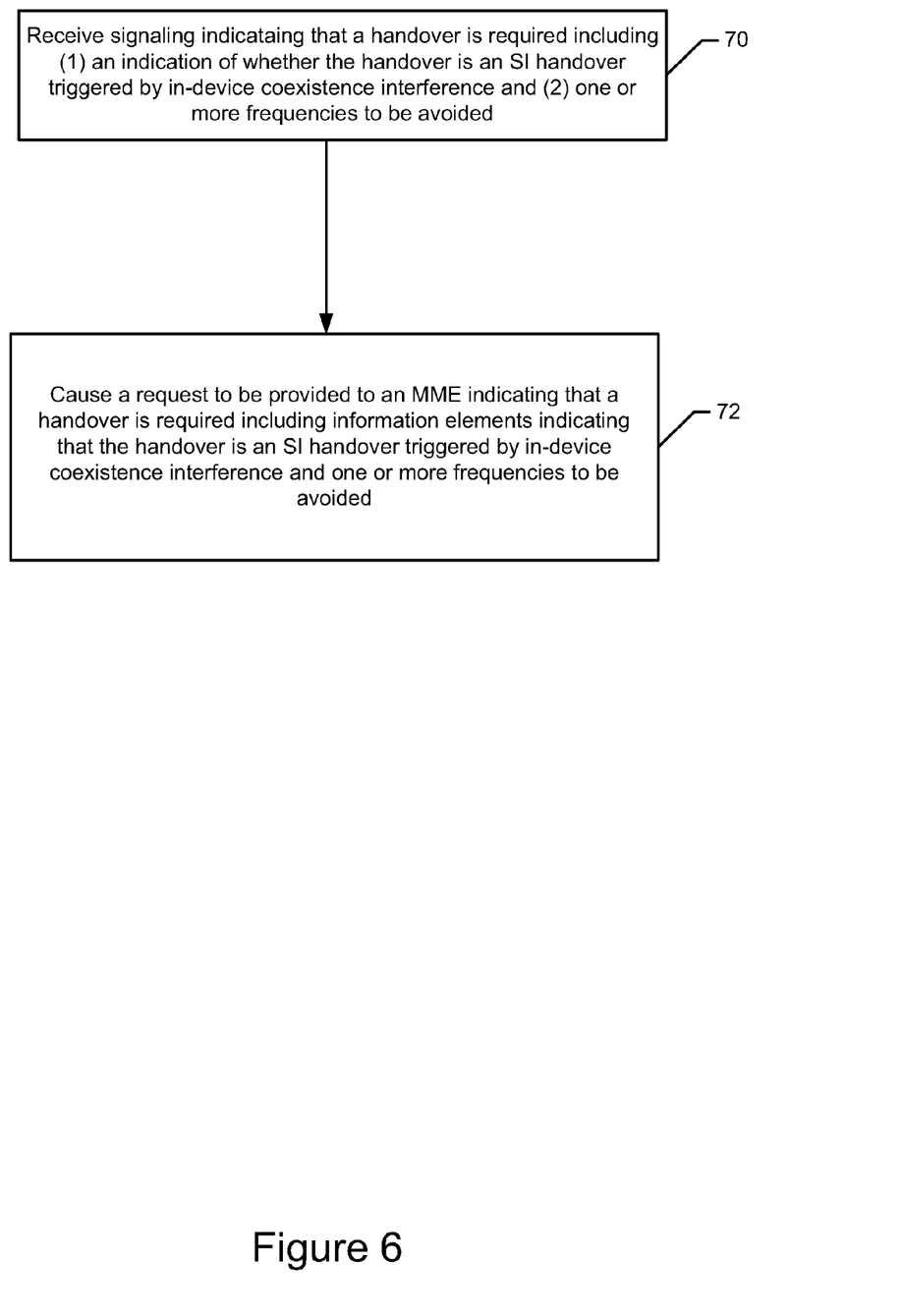
FIG. 6 illustrates the operations performed by a source MME in accordance with an example embodiment of the present invention in an instance in which relocation is needed.
Figure 7:
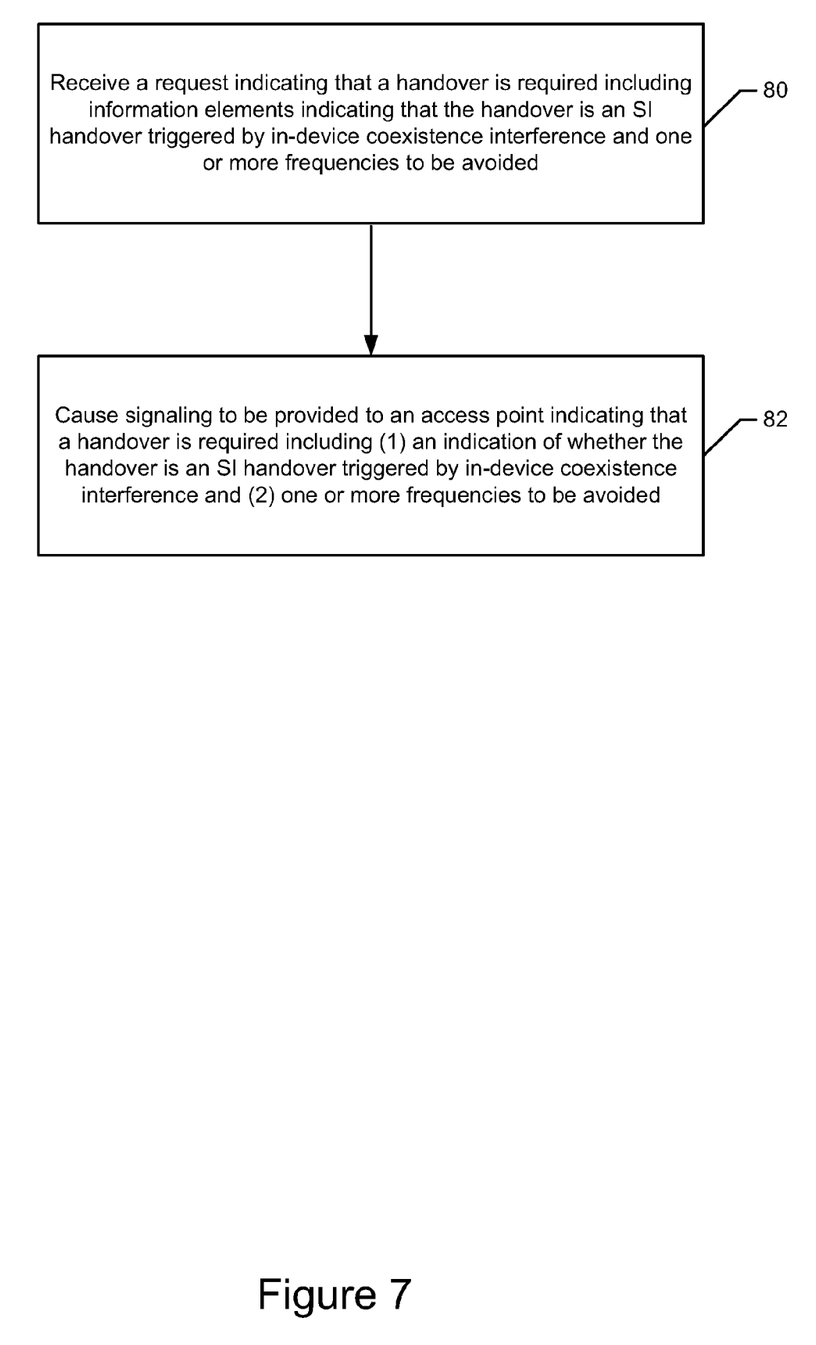
FIG. 7 illustrates the operations performed by a target MME in accordance with an example embodiment of the present invention.

Referring now to FIG. 6, the operations performed by a source MME 36 specifically configured in accordance with an example embodiment of the present invention are illustrated. In this regard, the apparatus 50 embodied by the source MME may include means, such as the processing circuitry, the processor 52, the communication interface 56 or the like, for receiving the signaling from the source access point 32 indicating that a handover is required. See block 70. As described above in conjunction with the source access point, the signaling may include an indication of whether the handover is a S1 handover of a mobile terminal that has experienced in-device coexistence interference at one or more frequencies and/or one or more frequencies to be avoided. In this regard, the signaling, such as the Handover Required signaling, may include an information element, such as a Handover-type information element, a Cause information element or a Message-type information element or a new information element, that indicates whether the handover is a S1 handover of a mobile terminal that has experienced in-device coexistence interference at one or more frequencies. Additionally or alternatively, the signaling from the source access point, such as the Handover Required signaling, may include an additional information element that identifies one or more information elements that identifies one or more frequencies to be avoided, such as a range of frequencies to be avoided, such as indicated in an in-device coexistence interference unusable frequency list information element.

As shown in block 72 of FIG. 6, the apparatus 50 embodied by the source MME 36 may also include means, such as the processing circuitry, the processor 52, the communication interface 56 or the like, for causing a request to be provided to an MME, such as the target MME 40, indicating that a handover is required. The request includes one or more information elements that includes a value that indicates that the handover is a S1 handover of a mobile terminal that has experienced in-device coexistence interference at one or more frequencies and/or one or more frequencies to be avoided. By way of example, the source MME may provide a Forward Relocation Request to the target MME as shown in FIG. 5. The Forward Relocation Request may include an additional information element that indicates that the handover is a S1 handover of a mobile terminal that has experienced in-device coexistence interference at one or more frequencies, such as a Handover Cause information element s. In addition or alternatively, the Forward Relocation Request of this example embodiment may include an additional information element that identifies one or more frequencies, such as a range of frequencies in an in-device coexistence interference unusable frequency list information element, to be avoided by the target access point in order to reduce or eliminate coexistence interference.

Based upon signaling from the source MME 36, such as the Forward Relocation Request from the source MME, the target MME 40 may determine that the handover is a handover of a mobile terminal that has experienced in-device coexistence interference at one or more frequencies and that there are one or more frequencies that should be avoided in order to reduce or eliminate the in-device coexistence interference issues. Referring now to FIG. 7, the operations performed by a target MME in response to receiving the signaling, such as the Forward Relocation Request, from the source MME are illustrated. As shown in block 80 of FIG. 7, the apparatus 50 embodied by the target MME includes means, such as the processing circuitry, the processor 52, the communication interface 56 or the like, for receiving the request, such as the Forward Relocation Request, indicating that a handover is required. As described above in conjunction with the source MME, the request may include an information element that indicates that the handover is a S1 handover of a mobile terminal that has experienced in-device coexistence interference at one or more frequencies. The request of this embodiment may also or alternatively include an information element that identifies one or more frequencies to be avoided during and after the handover.

Based upon the request that is received by the target MME 40, the target MME communicates corresponding information to the target access point 38, such as via a Handover Request as shown in FIG. 5. In this regard, the apparatus 50 embodied by the target MME may include means, such as the processing circuitry, the processor 52, the communication interface 56 or the like, for causing signaling to be provided to an access point, that is, the target access point, indicating that a handover is required. See block 80 of FIG. 7. The signaling may include an indication as to whether the handover is a S1 handover of a mobile terminal that has experienced in-device coexistence interference at one or more frequencies and/or one or more frequencies to be avoided. In this regard, the signaling may include an information element that, in turn, includes a value that indicates whether the handover is a S1 handover of a mobile terminal that has experienced in-device coexistence interference at one or more frequencies. In the embodiment in which the signaling provided by the target MME to the target access point is provided via a Handover Request as shown in FIG. 5, the information element that includes the value that indicates whether the handover is a S1 handover of a mobile terminal that has experienced in-device coexistence interference at one or more frequencies may be a Handover type information element, a Cause information element or a Message-type information element or a new information element. Additionally or alternatively, the signaling provided by the target MME to the target access point may include an additional information element that identifies one or more frequencies to be avoided, such as by defining a range of frequencies to be avoided. In the embodiment of FIG. 5, for example, the Handover Request provided by the target MME to the target access point may include an additional information element identifying the one or more frequencies to be avoided. In this regard, the additional information element may be a newly defined information element or a newly defined information element that is under another information elements in the Handover Request.

Following the receipt of the signaling from the target MME 40, such as following receipt of the Handover Request, the target access point 38 may proceed with the handover procedure, such as by setting up resources and then acknowledging the Handover Request as shown, for example, in FIG. 5. In this regard, the handover procedure may continue including the provision of a Handover Command, such as from the source MME 36 to the source access point 32 as discussed above in conjunction with block 62 of FIG. 4. Following the handover, the target access point 38 may service or otherwise support the mobile terminal 30. As a result of the receipt of information indicating that the S1 handover was attributable to in-device coexistence interference and/or in response to the indication of the one or more frequencies, such as a range of frequencies, that should be avoided, the target access point may support network communications by the mobile terminal in a manner that avoids and therefore does not utilize the one or more frequencies that are indicated to be avoided. As a result, the in-device coexistence interference experienced by the mobile terminal as a result of the network communications may be reduced or eliminated and, in any event, the ping-pong effect that might otherwise be created by the target access point utilizing frequencies that were indicated to be avoided by the source access point may be avoided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:
circuitry configured to
cause signaling to be provided to a mobility management entity (MME) indicating that a handover is required, wherein the signaling comprises at least one of a Handover Type information element, a Cause information element or a Message Type information element that includes a value that indicates whether the handover is a S1 handover of a mobile terminal that has experienced in-device coexistence interference at one or more frequencies, and wherein the signaling further comprises an information element that identifies one or more frequencies to be avoided; and
receive a handover command in response to the signaling.

2. The apparatus according to claim 1, wherein the apparatus is embodied by an access point.

3. The apparatus according to claim 2, wherein the access point is associated with the MME.

4. The apparatus according to claim 2, wherein the access point is an enhanced Node B (eNB) in a Long Term Evolution (LTE) network.

5. The apparatus according to claim 1, wherein the handover command is received from the MME.

6. An apparatus comprising:
circuitry configured to
cause signaling to be provided to a mobility management entity (MME) indicating that a handover is required, wherein the signaling comprises an information element that includes a value that indicates whether the handover is a S1 handover of a mobile terminal that has experienced in-device coexistence interference at one or more frequencies, and wherein the signaling further comprises an information element that identifies one or more frequencies to be avoided defines a range of frequencies to be avoided; and
receive a handover command in response to the signaling.

7. An apparatus comprising:
circuitry configured to
receive signaling indicating that a handover is required, wherein the signaling comprises an information element that includes a value that indicates whether the handover is a S1 handover of a mobile terminal that has experienced in-device coexistence interference at one or more frequencies, and wherein the signaling further comprises an information element that identifies one or more frequencies to be avoided during and after the handover; and
cause a request to be provided to a mobility management entity (MME) indicating that a handover is required, wherein the request comprises an information element that indicates that the handover is a S1 handover of the mobile terminal that has experienced in-device coexistence interference at one or more frequencies, and wherein the request further comprises an information element that identifies one or more frequencies to be avoided.

8. The apparatus according to claim 7, wherein the information element included within the signaling that includes a value that indicates whether the handover is a S1 handover of the mobile terminal that has experienced in-device coexistence interference at one or more frequencies is a Handover Type information element, a Cause information element or a Message Type information element.

9. The apparatus according to claim 7, wherein the information element included within the signaling that identifies one or more frequencies to be avoided defines a range of frequencies to be avoided.

10. The apparatus according to claim 7, wherein the information element included within the request that identifies one or more frequencies to be avoided during and after the handover defines a range of frequencies to be avoided.

11. The apparatus according to claim 7, wherein the apparatus is embodied by a different MME.

12. The apparatus according to claim 11, wherein the signaling indicating a handover is required is received from an access point associated with the different MME.

13. An apparatus comprising:
circuitry configured to
receive a request indicating that a handover is required, wherein the request comprises an information element that indicates that the handover is a S1 handover of a mobile terminal that has experienced in-device coexistence interference at one or more frequencies, and wherein the request further comprises an information element that identifies one or more frequencies to be avoided during and after the handover; and
cause signaling to be provided to an access point indicating that a handover is required, wherein the signaling comprises an information element that includes a value that indicates whether the handover is a S1 handover of the mobile terminal that has experienced in-device coexistence interference at one or more frequencies, and wherein the signaling further comprises an information element that identifies one or more frequencies to be avoided.

14. The apparatus according to claim 13, wherein the information element included within the request that identifies one or more frequencies to be avoided during and after the handover defines a range of frequencies to be avoided.

15. The apparatus according to claim 13, wherein the information element included within the signaling that includes a value that indicates whether the handover is a S1 handover of the mobile terminal that has experienced in-device coexistence interference at one or more frequencies is a Handover Type information element, a Cause information element or a Message Type information element.

16. The apparatus according to claim 15, wherein the information element included within the signaling that identifies one or more frequencies to be avoided defines a range of frequencies to be avoided.

17. The apparatus according to claim 13, wherein the apparatus is embodied by a mobility management entity (MME).

18. The apparatus according to claim 17, wherein the access point is associated with the MME.

19. The apparatus according to claim 17, wherein request indicating that a handover is required is received from a different MME.

* * * * *